Patented Feb. 22, 1949

2,462,697

UNITED STATES PATENT OFFICE 2,462,697

THIOPHENE-2-CARBOXYLIC ACID

Viktor Weinmayr, Pitman, N. J., assignor to E. I. du Pont de Nemours & Company, Wilmington, Del., a corporation of Delaware No Drawing. Application March 25, 1947, Serial No. 737,096

1 Claim. (Cl. 260—329)

This invention relates to an improvement in the process for the manufacture of thiophene-2-carboxylic acid, and more particularly to a process wherein the thiophene-2-carboxylic acid is produced directly in the reaction solvent employed in the formation of the 2-aceto-thienone.

While it is known that 2-aceto-thienone can be produced by condensing thiophene and acetyl chloride in the presence of a Friedel-Crafts condensation catalyst, such as anhydrous aluminum chloride, where the reaction is carried out in the presence of an organic solvent it would ordinarily be expected that the resulting 2-aceto-thienone should be isolated before it is reacted with an oxidizing agent such as sodium hypochlorite which is employed as an aqueous solution, for in this case the reactants are in two immiscible liquids.

It is an object of the present invention to provide a commercially feasible process for producing thiophene-2-carboxylic acid, which includes the oxidation of the 2-aceto-thienone with aqueous alkaline hypochlorite, directly in the solvent in which it is formed.

I have found that aceto-thienone can be oxidized by an aqueous alkaline hypochlorite solution to produce thiophene-2-carboxylic acid without isolating the aceto-thienone from the solvent in which it is formed by the condensation of the thiophene with acetic anhydride or acetyl chloride. In the preparation of the aceto-thienone by the Friedel-Crafts reaction, it is obtained in a water immiscible solvent, and I have found that by choosing a solvent which will not be attacked by the alkaline hypochlorite solution, it is possible to oxidize the aceto-thienone to the thiophene-2-carboxylic acid without isolation or even removal from the solvent used in the previous Friedel-Crafts condensation reaction. By this process, the thiophene-2-carboxylic acid can be produced on a commercial scale much more economically than is possible where the aceto-thienone must first be isolated and then oxidized in other reaction media. Since the thiophene-2-carboxylic acid will usually be employed in organic synthesis in the form of its acid chloride, the present process makes it possible to isolate the thiophene-2-carboxylic acid in solution in the organic solvent where it can be directly converted to the acid chloride for further use.

The following example is given to illustrate a specific form of the present invention wherein thiophene is condensed with acetic anhydride in nitrobenzene in the presence of aluminum chloride with subsequent oxidation of the resulting 2-aceto-thienone without isolation from the condensation mass. The parts used are by weight unless otherwise specified.

*Example*

146.5 parts of anhydrous aluminum chloride are dissolved in 600 parts of nitrobenzene and the solution is warmed to 40° C. A mixture of 107 parts of acetic anhydride (or the equivalent amount of acetyl chloride), 84 parts of thiophene and 60 parts of nitrobenzene are added at 40° to 45° C. over a period of about 30 minutes. The charge is then agitated for 2 hours longer at from 40° to 45° C. and then poured into cold water. The solvent layer containing the crude aceto-thienone is separated and made slightly alkaline with caustic. The water layer is discarded.

A sodium hypochlorite solution is prepared by adding 295 parts of chlorine to a solution of 401 parts of sodium hydroxide in 550 parts of water mixed with 2380 parts of ice. This solution is heated to 70° C., and the nitrobenzene solution of the crude aceto-thienone is added thereto at from 70° to 80° C. in about 30 minutes. (The charge is further agitated for about 2 hours at 70° to 80° C. After that time, the slight excess of bleach still remaining is destroyed by adding about 5 parts of sodium bisulfite.

The charge is then allowed to separate into the alkaline water layer and the nitrobenzene layer. The latter is drawn off, and the water layer is acidified with hydrochloric acid. The thiophene-2-carboxylic acid is filtered and washed at about 20° C., and dried.

96 parts of thiophene-2-carboxylic acid are obtained, melting at from 126.5° to 128.5° C. This is equal to a 75% yield, based on the amount of thiophene used.

Instead of separating the nitrobenzene from the caustic layer, the charge may be acidified while hot, in which case the thiophene-2-carboxylic acid is dissolved in the nitrobenzene and separated.

After neutralizing the excess mineral acid in the solution, it is dried, for instance by distilling out the water. After adding the required amount of thionyl chloride and removing the excess again by distillation, a solution of thiophene-2-carboxylic acid chloride is obtained, ready for further reaction as desired.

The manner in which the thiophene-2-carboxylic acid chloride is to be used will influence the choice of solvent used in the Friedel-Crafts condensation. Solvents particularly suitable for that purpose are nitrobenzene and chlorinated benzenes.

A particular advantage of the process is the fact that crude aceto-thienone dissolved in the solvent used for the Friedel-Crafts condensation can be used for the oxidation to thiophene-2-carboxylic acid, thus making it possible to produce thiophene-2-carboxylic acid from thiophene without requiring the isolation of an intermediate aceto-thienone.

I claim:

In a process for preparing thiophene-2-carboxylic acid and thiophene-2-carboxylic acid chloride, the steps which comprise condensing thiophene with acetic anhydride in an organic solvent of the class consisting of nitrobenzene and chlorinated benzenes and in the presence of anhydrous aluminum chloride to form 2-aceto-thienone, separating the solvent solution of the crude aceto-thienone from the reaction mass and oxidizing the 2-aceto-thienone while dissolved in the organic solvent with an aqueous alkaline solution of sodium hypochlorite to the sodium salt of thiophene-2-carboxylic acid.

VIKTOR WEINMAYR.

REFERENCES CITED

The following references are of record in the file of this patent:

UNITED STATES PATENTS

| Number | Name | Date |
|---|---|---|
| 939,940 | Barstow | Nov. 9, 1909 |
| 2,005,183 | Flemming | June 18, 1935 |

OTHER REFERENCES

Justus Liebig's Annalen der Chemie 236, p. 205 (1886).